United States Patent Office 3,110,583
Patented Nov. 12, 1963

3,110,583
LAWN FERTILIZER
Ralph W. Richardson, 5128 S. Passage Drive,
Pittsburgh, Pa.
No Drawing. Filed Mar. 5, 1962, Ser. No. 177,160
1 Claim. (Cl. 71—61)

The value of this invention is to produce a low cost, dry lawn fertilizer from ammonium sulphate $(NH_4)SO_4$. It enables the average family to make greater use of this highly desirable lawn fertilizing agent in developing low cost, luxuriant lawns.

Ammonium sulphate is produced as a by-product of the "by-product coking process" whereby coke is essentially produced by steel companies for use in their blast furnaces in making iron. Ammonium sulphate contains approximately 21% nitrogen and, when highly diluted with water, can be and has been used as a low cost fertilizer. However, the public has been slow in accepting this usage to any great extent due to the inconvenience of mixing, application and the uncertain results obtained. On lawns, this shows as spots of different shades of green, instead of a uniform, pleasing dark green. Fertilizer in a dry state achieves more efficient and uniform results and, therefore, is preferred. Ammonium sulphate is marketed in the dry state but is too highly concentrated for safe use.

Fly ash is a waste product, produced by power plants which use pulverized coal. This fly ash, in the main, is hauled away to waste dumps. Fly ash is very fine—95% passing a 200 mesh sieve and 90% passing a 300 mesh sieve. Fly ash makes an ideal, low cost dry substitute for water for the purpose of physically diluting ammonium sulphate to make it usable as a dry fertilizer especially for developing luxuriant lawns.

A typical analysis of fly ash is:

| | Percent |
|---|---|
| Silica $(SiO_2)$ | 46.9 |
| Alumina $(Al_2O_3)$ | 27.9 |
| Iron $(Fe_2O_3)$ | 9.1 |
| Carbon (C) | 10.8 |
| Calcium (CaO) | 2.34 |
| Magnesia (MgO) | .74 |
| Other | 2.22 |

By mixing the fly ash with the ammonium sulphate, the extreme fineness of the fly ash dilutes the ammonium sulphate in a dry state in the same manner as water dilutes ammonium sulphate in a wet state.

The mixture of ammonium sulphate and fly ash in the proper proportions is just a little too fine to permit 100% efficient application. It has a tendency to bridge-over in a fertilizer spreader, requiring manual assistance to maintaining a uniform flow to the discharging orifices.

To overcome this bridging-over effect, there are several coarseners that can be added, depending upon their availability and cost. Granulated slag, boiler house cinders, coal, sand and shale are such examples. These coarseners must be reduced to 1/8" maximum size.

Granulated slag (a by-product of blast furnaces producing iron) and boiler house cinders (the end product of the burning of lump coal in steam plants) are both excellent soil conditioners in themselves and also contain many elements beneficial to lawn excellence. They are preferred, if available.

A typical analysis of granulated slag is:

| | Percent |
|---|---|
| Silica $(SiO_2)$ | 35.02 |
| Alumina $(Al_2O_3)$ | 14.99 |
| Lime (CaO) | 44.03 |
| Magnesia (MgO) | 2.72 |
| Iron $(Fe_2O_3)$ | 1.16 |
| Manganese (MnO) | 1.08 |
| Sulphur (S) | 1.35 |

A typical analysis of boiler house cinders is:

| | Percent |
|---|---|
| Silica $(SiO_2)$ | 36.7 |
| Alumina $(Al_2O_3)$ | 21.5 |
| Iron $(Fe_2O_3)$ | 7.3 |
| Carbon (C) | 29.8 |
| Calcium (Ca) | 1.8 |
| Magnesia (MgO) | .6 |
| Others | 2.3 |

By combining the coarsener, such as granulated slag or boiler house cinders—1/8" maximum size, with the ammonium sulphate and the fly ash, a blend is obtained which is ideal for spreader application of the resulting dry lawn fertilizer and in addition, a blend of elements is obtained which is very beneficial as a soil conditioner and is very conducive to healthy lawn growth.

Each of the foregoing materials has been used more or less invidually, but no attempt has been made to combine them for the purpose of producing a lawn fertilizer. The outstanding feature of the combination, aside from the plant food elements contained, is the fact that it permits ammonium sulphate to be diluted in a dry state at low cost for successful use as a lawn fertilizer, under controlled conditions.

I have experimentally tested two blends of this lawn fertilizer, the one consisting of one part of ammonium sulphate, two parts of fly ash and one-half part of granulated slag by volume and the other consisting of one part of ammonium sulphate, two parts of fly ash and one-half part of boiler house cinders by volume, with equally fine results. However, many different combinations can be used, depending on the amount of dilution of the ammonium sulphate that is desired.

Although the coarsener can be added, as above stated, the invention is directed primarily to the use of the fly ash as a diluent for the ammonium sulphate, and those materials, in the proportion of twice the fly ash to the amount of ammonium sulphate were used successfully, and in that use, the tendency to bridge, above referred to, was discovered. The addition of the coarsener is thought of as an improvement, not as necessary.

The primary basis of the foregoing product is the use of fly ash as a substitute for water as a solvent, mixer and carrying agent for the purpose of physically diluting the ammonium sulphate and producing a dry mixture of the proper nitrogen content to promote the most effective lawn growth. The addition of a coarsener such as granulated slag, boiler house cinders, coal, sand, shale, all of 1/8" maximum size, gives the combination a proper coarseness, after its fine dilution, to permit regulated flow when applied to lawns by the spreader process. The result is a very effective, low cost, dry lawn fertilizer.

By using this method of diluting ammonium sulphate with fly ash, the nitrogen of ammonium sulphate is made available in dry, controlled amounts for direct, successful usage on lawns at half the present cost of dry lawn fertilizers.

The ammonium sulphate and fly ash are obtainable in the correct blending size. The coarseners must be reduced to 1/8" maximum size and in some cases, must be dried before being usable. In blending, a controlled stream of fly ash, a controlled stream of ammonium sulphate and a controlled stream of coarsener are directed into one another at a common discharge point within a hopper. The partially blended mix is then discharged into a rotary mixer for final blending. After final blending, the lawn fertilizer is delivered to another hopper which feeds the sacking machine.

In line with my experimentation and discovery, I make claim and request patent rights to the following:

A dry lawn fertilizer composition consisting essentially of intimately mixed dry ammonium sulphate and dry fly ash as a diluent in the proportions of at least twice as much fly ash as ammonium sulphate by volume.

References Cited in the file of this patent

UNITED STATES PATENTS

| | | |
|---|---|---|
| 307,718 | Haas | Nov. 4, 1884 |
| 2,502,809 | Vogelsang | Apr. 4, 1950 |
| 2,532,548 | Heide | Dec. 5, 1950 |
| 2,883,298 | Meadows | Apr. 21, 1959 |

FOREIGN PATENTS

| | | |
|---|---|---|
| 248 of 1852 | Great Britain | Oct. 6, 1852 |
| 1,671 of 1855 | Great Britain | Oct. 30, 1855 |
| 292,809 | Great Britain | June 28, 1928 |